A. B. White,
Bolt Cutter.
N° 76,863. Patented Apr. 14, 1868.
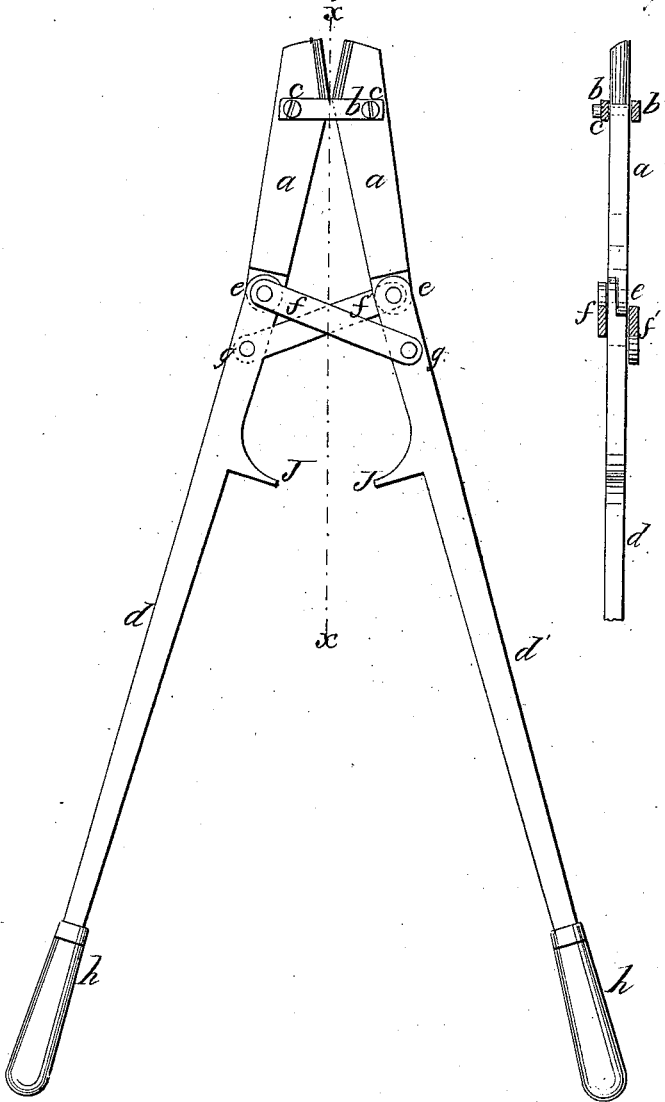
Witnesses:
W. C. Ashketter
Theo Fischer
Inventor:
Aaron B. White
per Munn & Co.
attorneys.

United States Patent Office.

AARON B. WHITE, OF MENDON, MICHIGAN.

Letters Patent No. 76,863, dated April 14, 1868.

---

IMPROVED BOLT-TRIMMER.

---

The Schedule referred to in these Letters Patent and making part of the same.

---

TO ALL WHOM IT MAY CONCERN:

Be it known that I, AARON B. WHITE, of Mendon, in the county of St. Joseph, and State of Michigan, have invented a new and improved Bolt and Rivet-Trimmer; and I do hereby declare that the following is a full, clear, and exact description thereof, which will enable those skilled in the art to make and use the same, reference being had to the accompanying drawings, forming part of this specification.

This invention relates to a new and useful improvement for cutting or trimming the ends of bolts and rivets, an operation which has usually been performed with hammer and cold-chisel.

And the invention consists in the arrangement of two cutting-levers, which are operated upon by other levers, whereby a double purchase, or the power of a compound lever is obtained, as will hereinafter be more fully described.

Figure 1 represents a longitudinal side view of the trimmer complete, showing the arrangement of the parts of which it is composed in their proper positions when it is open or ready to grasp the bolt or rivet.

Figure 2 is a longitudinal section through the line $x\ x$.

Similar letters of reference indicate corresponding parts.

This bolt-cutter or trimmer is formed of two cutting-levers, $a\ a$, which are connected and tied together by plates (one on each side) marked $b$.

The screws or rivets by which these plates are secured to the cutters are marked $c$, and form the fulcra on which the cutters work.

Connected to the other ends of these cutters there are two other levers, which form handles by which the cutters are operated.

These lever-handles are marked $d\ d'$. They are not rigidly connected with the cutters, but by pivot-joints, as seen at $e\ e$. The ends of each are halved, as seen in fig. 2.

$f f'$ are straps, (one on each side,) one end of each being attached to the joint $e$, and crossing each other, as seen in fig. 1. Their other ends are attached to the lever-handles $d\ d'$, so that these latter connections, $g$, form the fulcra of these levers; that is, the connecting-rivet $g$ of the strap $f'$ is the fulcrum of the lever $d$, and the rivet $g$ of the strap $f$ is the fulcrum of the lever $d'$.

It will be seen that the lever-cutters $a$ and the handle-levers $d\ d'$, form two compound levers, which operate with great power upon any resisting substance between the cutters, when power is applied to the handles $h\ h$. J J represent stop-lugs on the levers $d\ d'$.

The connections between these compound levers being all flexible, the cutters will adjust themselves so that the strain upon the joints will be equalized, and consequently durability and ease of action are insured.

Having thus described my invention, I claim as new, and desire to secure by Letters Patent—

The combination of levers $d\ d'$, having stops J J thereon, with shear-levers $a\ a$, straps $b\ b$ and $f f$, all constructed, arranged, and operating substantially as described.

AARON B. WHITE.

Witnesses:
  CHAS. H. LEWIS,
  D. K. VANNESS.